United States Patent [19]

Baker et al.

[11] 3,719,675

[45] March 6, 1973

[54] DINITROPHENOXYMETHYL AMINES

[75] Inventors: Joseph W. Baker, Kirkwood; Ignatius Schumacher, Webster Groves, both of Mo.

[73] Assignee: Monsanto Company, St. Louis, Mo.

[22] Filed: July 13, 1970

[21] Appl. No.: 54,605

[52] U.S. Cl.....260/247.7 C, 260/293.83, 260/570.7, 424/248
[51] Int. Cl. .............................................C07d 87/32
[58] Field of Search ...................260/247.7 C, 293.83

[56] References Cited

UNITED STATES PATENTS

| | | | |
|---|---|---|---|
| 2,287,464 | 6/1942 | Bock | 260/570.7 |
| 3,178,447 | 4/1965 | Kohn | 260/326.5 S |
| 3,496,080 | 2/1970 | Harris | 260/348 R |
| 3,584,014 | 6/1971 | Firestone et al. | 260/348 R |

FOREIGN PATENTS OR APPLICATIONS

| 8,988 | 1895 | Great Britain | 260/570.7 |
|---|---|---|---|

OTHER PUBLICATIONS

Kirby et al., Chemical Abstracts, Vol. 63, p. 17943, (1965).

*Primary Examiner*—Alex Mazel
*Assistant Examiner*—Jose Tovar
*Attorney*—J. E. Maurer, N. E. Willis and H. C. Stanley

[57] ABSTRACT

Dinitrophenoxymethyl amines as new chemical compounds. These compounds have been found to be useful in the control of bacteria.

2 Claims, No Drawings

DINITROPHENOXYMETHYL AMINES

This invention relates to a novel class of organic chemical compounds. More particularly, this invention is concerned with novel dinitrophenoxymethyl amines. Such materials have been found to possess useful and unexpected biological activity. The novel compounds of this invention have the formula

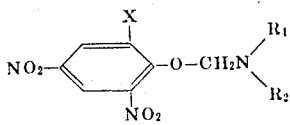

wherein
- X is alkyl, alkoxy, alkenyl, haloalkyl of up to eight carbon atoms, aryl, haloaryl or halogen,
- $R_1$ is alkyl, alkenyl, aryl, haloalkyl, hydroxyalkyl, cycloalkyl, cyanoalkyl, alkoxyalkyl or haloalkenyl,
- $R_2$ is hydrogen, alkyl, alkenyl, aryl, aralkyl, haloalkyl, hydroxyalkyl, cycloalkyl, cyanoalkyl, alkoxyalkyl or haloalkenyl, and
- $R_1$ and $R_2$ together with the adjacent nitrogen atom can form a heterocyclic ring, provided, however, that there are from one to about 20 carbon atoms in $R_1$ and $R_2$ and the halogen is selected from the group consisting of chlorine, bromine or iodine.

The novel dinitrophenoxymethyl amines of this invention can be readily prepared by reacting a 2,4-dinitro-6-substituted phenol with formaldehyde and an amine. In carrying out such a reaction it is preferred to first prepare a solution of the amine. A solution of formaldehyde is then added followed by a solution of the phenol to yield the desired product. A typical reaction is illustrated by the following equation:

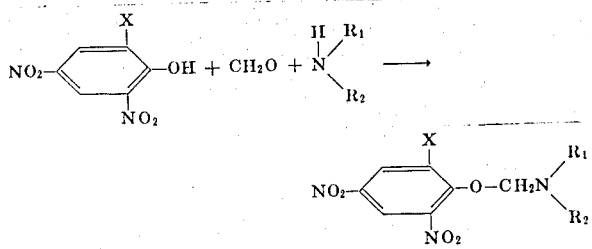

wherein X, $R_1$ and $R_2$ have the same meanings as defined hereinabove.

It is preferred to carry out the reaction in the presence of an inert organic solvent. Suitable solvents include benzene, toluene, xylene, the chlorinated benzenes, ethyl ether, propyl ether, tetrahydrofuran, and the like. The reaction temperatures employed in the preparation of the compounds of this invention will vary from room temperature to the reflux temperature of the reaction mixture. The specific temperature employed in any given preparation will be primarily dependent upon the particular reactants used therein.

Dinitrophenoxymethylamines exemplary of this invention include:
N-(2,4-dinitro-6-n-hexylphenoxymethyl)-nonylamine
N-(2,4-dinitro-6-chlorophenoxymethyl)-phenylamine
N-(2,4-dinitro-6-sec-butylphenoxymethyl)-morpholine
N-(2,4-dinitro-6-bromophenoxymethyl)-ethylamine
N-(2,4-dinitro-6-ethylphenoxymethyl)-bis(2-chloroethyl)amine
N-(2,4-dinitro-6-isooctylphenoxymethyl)-2-dodecylphenylamine
N-(2,4-dinitro-6-iodophenoxymethyl)-diethylamine
N-(2,4-dinitro-6-methylphenoxymethyl)-bis(2-chloroethyl)amine
N-(2,4-dinitro-6-propylphenoxymethyl)-diethylamine
N-(2,4-dinitro-6-heptylphenoxymethyl)-octadecylamine
N-(2,4-dinitro-6-isopropylphenoxymethyl)-N-methyl-dodecylamine
N-(2,4-dinitro-6-chlorophenoxymethyl)-piperidine
N-(2,4-dinitro-6-methylphenoxymethyl)-morpholine
N-(2,4-dinitro-6-methylphenoxymethyl)-N-propyl-dodecylamine N-(2,4-dinitro- 6-sec-butylphenoxymethyl)-N, N-dicyclohexylamine (2,4-dinitro-6- -hexylphenoxymethyl)-cyclohexylamine N-(2,4-dinitro-6-bromophenoxymethyl)-cyanopropylamine.

The invention will be more fully understood by reference to the following examples which are set forth herein for the purpose of illustration only and which are not to be construed as limiting the scope of this invention in any manner.

EXAMPLE 1

N-(2,4-dinitro-6-sec-butylphenoxymethyl)-morpholine

A suitable reaction vessel is charged with 1.75 grams (0.02 moles) of morpholine in 10 ml. of water and maintained at 15°–20° C. To the vessel is charged 10 ml. of an aqueous solution containing 0.025 moles of formaldehyde. A 30 ml. ether solution containing 4.8 grams (0.02 moles) of 2,4-dinitro-6 -sec-butyl phenol is added to the resulting mass over a ½ hour period. There was collected 6 grams of an orange solid with a melting point of 70°–75° C. The product is confirmed to be N-(2,4-dinitro- 6-sec-butylphenoxymethyl)-morpholine.

EXAMPLE 2

N-(2,4-dinitro-6-n-hexylphenoxymethyl)-nonylamine

Following the detailed procedure set forth in Example 1, the reactants employed are 0.1 moles of 2,4-dinitro-6-h-hexylphenol, 0.1 moles of nonylamine and 0.125 moles of formaldehyde. The product obtained is N-(2,4-dinitro-6-n- hexylphenoxymethyl)-nonylamine.

EXAMPLE 3

N-(2,4-dinitro-6-isooctylphenoxymethyl)-dodecylphenylamine

Following the detailed procedure set forth in Example 1, the reactants employed are 0.02 moles of 2,4-dinitro-6-isooctylphenol, 0.02 moles of 2-dodecylaniline and 0.025 moles of formaldehyde. The product obtained is N-(2,4-dinitro-6-isooctylphenoxymethyl)-dodecylphenylamine.

EXAMPLE 4

N-(2,4-dinitro-6-methylphenoxymethyl)-bis(2-chloroethyl)amine

Following the detailed procedure set forth in Example 1, the reactants employed are 0.05 moles of 2,4-dinitro-6-methylphenol, 0.05 moles of bis(2-chloroethyl) amine and 0.062 moles of formaldehyde. The product obtained N-(2,4-dinitro-6-methylphenoxymethyl)-bis(2-chloroethyl)amine.

EXAMPLE 5

N-(2,4-dinitro-6-propylphenoxymethyl)-diethylamine

Following the detailed procedure set forth in Example 1, the reactants employed are 0.1 moles of 2,4-dinitro-6-propylphenol, 0.1 moles of diethylamine and 0.125 moles of formaldehyde. The product obtained is N-(2,4-dinitro-6-propylphenoxymethyl)-diethylamine.

EXAMPLE 6

N-(2,4-dinitro-6-heptylphenoxymethyl)-octadecylamine

Following the detailed procedure set forth in Example 1, the reactants employed are 0.1 moles of 2,4-dinitro-6-heptylphenol, 0.1 moles of octadecylamine and 0.125 moles of formaldehyde. The product obtained is N-(2,4-dinitro-6-heptylphenoxymethyl)-octadecylamine.

EXAMPLE 7

N-(2,4-dinitro-6-isopropylphenoxymethyl)-N-methyl-dodecylamine

Following the detailed procedure set forth in Example 1, the reactants employed are 0.02 moles of 2,4-dinitro-6-isopropylphenol, 0.02 moles of methyl-dodecylamine and 0.025 moles of formaldehyde. The product obtained is N-(2,4-dinitro-6-isopropylphenoxymethyl)-N-methyl-dodecylamine.

As stated above, the products of the present invention are useful as microbiocides adapted to be employed for the control of bacterial organisms. In a representative test, N-(2,4-dinitro-6-sec-butylphenoxymethyl)-morpholine is found to be effective against *Staphylococcus aureus* at a dilution in excess of one part per million against *Salmonella typhosa* at a dilution in excess of one part per ten thousand and against *Pseudomonas aerugenosa* at one part per thousand. Similar activity is displayed by other and different dinitrophenoxymethyl amines of this invention.

Relatively small amounts of these dinitrophenoxymethyl amines in a detergent soap composition have been found to yield effective antiseptic detergent soap compositions. Amounts as low as 0.5 to 1 percent by weight based upon the weight of the detergent soap have proved satisfactory in some instances. However, it is preferred to employ these dinitrophenoxymethyl amines in amounts in the order of 1 to 3 percent by weight based on the detergent soap. While larger amounts may be for example, up to 10 percent by weight the upper limit will be determined by practical considerations. Various colors, antioxidants, perfumes, water softeners, emollients and the like may be included where desirable in detergent soap compositions containing the new dinitrophenoxymethyl amines. The term "soap" or "detergent soap" as used herein is employed in its popular or ordinary sense, i.e., those cleansing compositions prepared from an alkali metal compound such as potassium or sodium hydroxide and a fat or fatty acid, both saturated and unsaturated.

The dinitrophenoxymethyl amines of this invention have also displayed activity as herbicides, fungicides and insecticides.

While the invention has been described herein with regard to certain specific embodiments, it is not so limited. It is to be understood that variations and modifications thereof may be made by those skilled in the art without departing from the spirit and scope of the invention.

The embodiments of the invention in which an exclusive property or privilege is claimed are defined as follows:

1. A compound of the formula

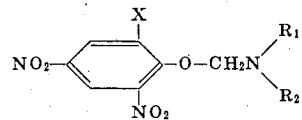

wherein $R_1$ and $R_2$ together with the adjacent nitrogen atom form a morpholino or piperidino ring and X is chloro, bromo, iodo or alkyl of from 1 to 8 carbon atoms.

2. A compound as defined in claim 1 which is N-(2,4-dinitro-6-sec-butylphenoxymethyl)-morpholine.

* * * * *